US008503353B2

(12) United States Patent
Chen et al.

(10) Patent No.: US 8,503,353 B2
(45) Date of Patent: Aug. 6, 2013

(54) REVERSE LINK POWER AND DATA RATE CONTROL

(75) Inventors: Pei Chen, San Diego, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 335 days.

(21) Appl. No.: 12/940,361

(22) Filed: Nov. 5, 2010

(65) Prior Publication Data

US 2012/0113890 A1 May 10, 2012

(51) Int. Cl.
*H04B 7/204* (2006.01)
*H04B 7/185* (2006.01)

(52) U.S. Cl.
USPC .......................................... 370/319; 370/318

(58) Field of Classification Search
USPC .................................. 370/318, 319
See application file for complete search history.

(56) References Cited

U.S. PATENT DOCUMENTS

| 7,633,895 | B2 * | 12/2009 | Schiff et al. | 370/321 |
|---|---|---|---|---|
| 2004/0018849 | A1 * | 1/2004 | Schiff | 455/522 |
| 2010/0105343 | A1 | 4/2010 | Stebbings et al. | |

FOREIGN PATENT DOCUMENTS

EP 1235374 A2 8/2002

OTHER PUBLICATIONS

International Search Report and Written Opinion—PCT/US2011/058797—ISA/EPO—Feb. 7, 2012.

* cited by examiner

*Primary Examiner* — Kenny Lin
(74) *Attorney, Agent, or Firm* — Jeffrey D. Jacobs

(57) ABSTRACT

Arrangements are presented for adjusting a power level and data rate at an access terminal. The access terminal may include a transmitter module configured to transmit data packets to a gateway. The access terminal may include a receiver module configured to receive control data generated at the gateway. The access terminal may also include a control module. The control module may evaluate the received control data. The control module may increase a transmit power level for data packets to be transmitted from the transmitter module when a first set of conditions is not satisfied. In the first set of conditions, the control data may include a first command. The control module may increase a data rate for data packets to be transmitted from the transmitter module when a second set of conditions is satisfied. In the second set of conditions, the control data may include a second command.

40 Claims, 9 Drawing Sheets

REVERSE LINK POWER AND DATA RATE CONTROL

BACKGROUND

The following relates generally to wireless communication, and more specifically to satellite-based wireless communications systems. Wireless communications systems are widely deployed to provide various types of communication content, such as voice, video, packet data, messaging, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, and frequency division multiple access (FDMA) systems.

In satellite-based communications systems, the use of mobile devices can present a challenge because of the power consumption for transmission over long distances. In many cases, the satellite used in such communications systems is in a geosynchronous orbit, meaning the satellite remains tens of thousands of miles above roughly the same earth-bound location. This distance also creates increased latency between when the signal is transmitted and when it is received.

In addition, due at least in part to this distance and the power limitations, the data rate to and from a mobile device in such a system may be limited significantly. Because of these challenges, there may be a need for novel power and rate control systems on the reverse link in satellite communications systems.

SUMMARY

The described features generally relate to one or more improved systems, methods, and/or apparatuses for reverse link power and data rate control. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

An example of an access terminal may be provided. The access terminal may include a transmitter module configured to transmit data packets to a gateway via a satellite. The access terminal may also include a receiver module configured to receive, responsive to the transmitted data packets, control data generated at the gateway and transmitted from the gateway to the access terminal via the satellite. The access terminal may include a control module, communicatively coupled with the transmitter module and the receiver module. The access terminal may evaluate the received control data. If the control data comprises a first command and a first set of conditions is not satisfied, the control module may adjust a transmit power level for data packets to be transmitted from the transmitter module. If the control data comprises a second command different from the first command and a second set of conditions is satisfied, the control module may increase a data rate for data packets to be transmitted from the transmitter module.

Examples of an access terminal may include one or more of the following features described in this paragraph. The control data may be a single variable. The control data may be a single bit. The access terminal may further comprise a power amplification module, communicatively coupled with the control module, and configured to evaluate power amplification headroom of the transmitter. Also, the control module may be further configured to determine whether the power amplification headroom is greater than a threshold level when the control data comprises the first command. The control module may be further configured to decrease the data rate for data packets to be transmitted from the transmitter if the first set of conditions is satisfied, wherein in the first set of conditions the control data comprises the first command and a determination that the average power amplification headroom is less than the threshold level. The first set of conditions may also include the transmitter transmitting at a maximum power level. The first set of conditions may also include the data rate that is greater than a minimum data rate of the transmitter. The control module may be further configured to decrease the transmit power level for data packets to be transmitted from the transmitter module if the second set of conditions is not satisfied, wherein in the second set of conditions the control data comprises the second command. The second set of conditions may include a determination that the power amplification headroom is greater than a threshold level. The second set of conditions may further comprise the data rate having remained constant for longer than a threshold period of time. The second set of conditions may further comprise the data rate being lower than a maximum data rate of the transmitter module.

An exemplary method for power level and data rate control in a satellite communications system includes: transmitting, from an access terminal, data packets to a gateway via a satellite; and receiving, by the access terminal, responsive to the transmitted data packets, control data transmitted by the gateway to the access terminal via the satellite. The method may also include evaluating, by the access terminal, the control data. If the control data comprises a first command and a first set of conditions is not satisfied, adjusting, by the access terminal, a power level of data packets to be transmitted by the transmitter module; and if the control data comprises a second command different from the first command and a second set of conditions is satisfied, increasing, by the access terminal, a data rate of data packets to be transmitted from the transmitter module.

Examples of such a method may include one or more of the following features described in this paragraph. The control data may be a single bit. The method may include evaluating, by the access terminal, a power amplification headroom of the transmitter. The method may include decreasing, by the access terminal, the data rate for data packets to be transmitted from the transmitter module if the first set of conditions is satisfied. The first set of conditions may include determining, by the access terminal, that the average power amplification headroom is less than the threshold level. The first set of conditions may include determining, by the access terminal, that the transmitter is transmitting at a maximum power level. The first set of conditions may also include determining, by the access terminal, that the data rate is greater than a minimum data rate of the transmitter. The method may include decreasing, by the access terminal, the transmit power level for data packets to be transmitted from the transmitter module if the second set of conditions is not satisfied, and the control data comprises the second command. The second set of conditions may further include determining, by the access terminal, that the power amplification headroom is greater than a threshold level. The second set of conditions may include determining, by the access terminal, that the data rate has remained constant for longer than a threshold period of time.

An exemplary computer program product residing on a processor-readable medium and comprising processor-readable instructions may be configured to cause a processor to:

transmit data packets to a gateway via a satellite; receive, responsive to the transmitted data packets, control data transmitted by the gateway to the access terminal via the satellite; evaluate the control data; and if the control data comprises a second command different from the first command and a first set of conditions is not satisfied, adjusting a power level of voice packets to be transmitted by the transmitter module; and if the control data comprises a second command different from the first command and a second set of conditions is satisfied, increasing a data rate of data packets to be transmitted from the transmitter module.

Examples of such a computer program product may include one or more of the following features described in this paragraph. The control data may be a single variable. The control data may be a single bit. The processor-readable instructions may further comprise instructions configured to cause the processor to evaluate a power amplification headroom of the transmitter. The processor-readable instructions may further comprise instructions configured to cause the processor to: decrease the data rate for data packets to be transmitted from the transmitter module when a first set of conditions is satisfied, wherein the first set of conditions comprises: determining that the control data comprises the first command; and determining that the power amplification headroom is less than the threshold level. The processor-readable instructions may further comprise instructions configured to cause the processor to: decrease the transmit power level for data packets to be transmitted from the transmitter module if the second set of conditions is not satisfied, and the control data comprises the second command. The second set of conditions may further include determining that the power amplification headroom is greater than the threshold level. The second set of conditions further comprises determining that the data rate has remained constant for longer than a threshold period of time.

An exemplary access terminal may include: means for transmitting data packets to a gateway via a satellite; means for receiving, responsive to the transmitted data packets, control data generated at the gateway and transmitted from the gateway to the access terminal via the satellite; means for evaluating the received control data; means for adjusting a transmit power level for data packets to be transmitted from the access terminal if the control data comprises a first command and a first set of conditions is not satisfied; and means for increasing a data rate for data packets to be transmitted from the access terminal if the control data comprises a second command different from the first command and a second set of conditions is satisfied.

An exemplary access terminal may include one or more of the following features described in this paragraph. The control data may be a single bit. The access terminal may comprise means for evaluating power amplification headroom of the transmitter. The access terminal may comprise means for determining whether the power amplification headroom is greater than a threshold level when the control data comprises the first command. The control module may be further configured to decrease the data rate for data packets to be transmitted from the access terminal if the first set of conditions is satisfied, wherein in the first set of conditions the control data comprises the a determination that the power amplification headroom is less than the threshold level. The access terminal may include means for decreasing the transmit power level for data packets to be transmitted when the second set of conditions is not satisfied, wherein in the second set of conditions the control data comprises the second command. The second set of conditions may include a determination that the power amplification headroom is greater than a threshold level. The second set of conditions may further comprise the data rate having remained constant for longer than a threshold period of time. The second set of conditions may further comprise the data rate being lower than a maximum data rate.

An exemplary communications system may include a gateway configured to receive a communication signal comprising voice packets from an access terminal via a satellite. The gateway may be configured to determine a data rate of the data packets received from the access terminal via the satellite using blind detection. The gateway may be configured to evaluate a power level of the communication signal. The gateway may also be configured to transmit control data responsive to the power level evaluation of the communication signal. The system may also include the access terminal, in communication with the gateway via the satellite. The access terminal may transmit the communication signal to the gateway via the satellite. The access terminal may receive the control data from the gateway via the satellite. The access terminal may evaluate the received control data. If the control data comprises a first command and a first set of conditions is not satisfied, adjust a transmit power level for data packets to be transmitted from the access terminal; and if the control data comprises a second command different from the first command and a second set of conditions is satisfied, increase a data rate for data packets to be transmitted from the access terminal.

Examples of such a system may include one or more of the following features described in this paragraph. The control data transmitted by the gateway may be part of data packets. Evaluating the power level of the communication signal at the gateway may comprise comparing the received communication signal to a threshold signal strength level. The control data may be a single bit. Data received as part of a data packet from the access terminal via the satellite may be routed to another network. The access terminal may be further configured to decrease the transmit power level for data packets to be transmitted when the second set of conditions is not satisfied, wherein in the second set of conditions the control data comprises the second command.

BRIEF DESCRIPTION OF THE DRAWINGS

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
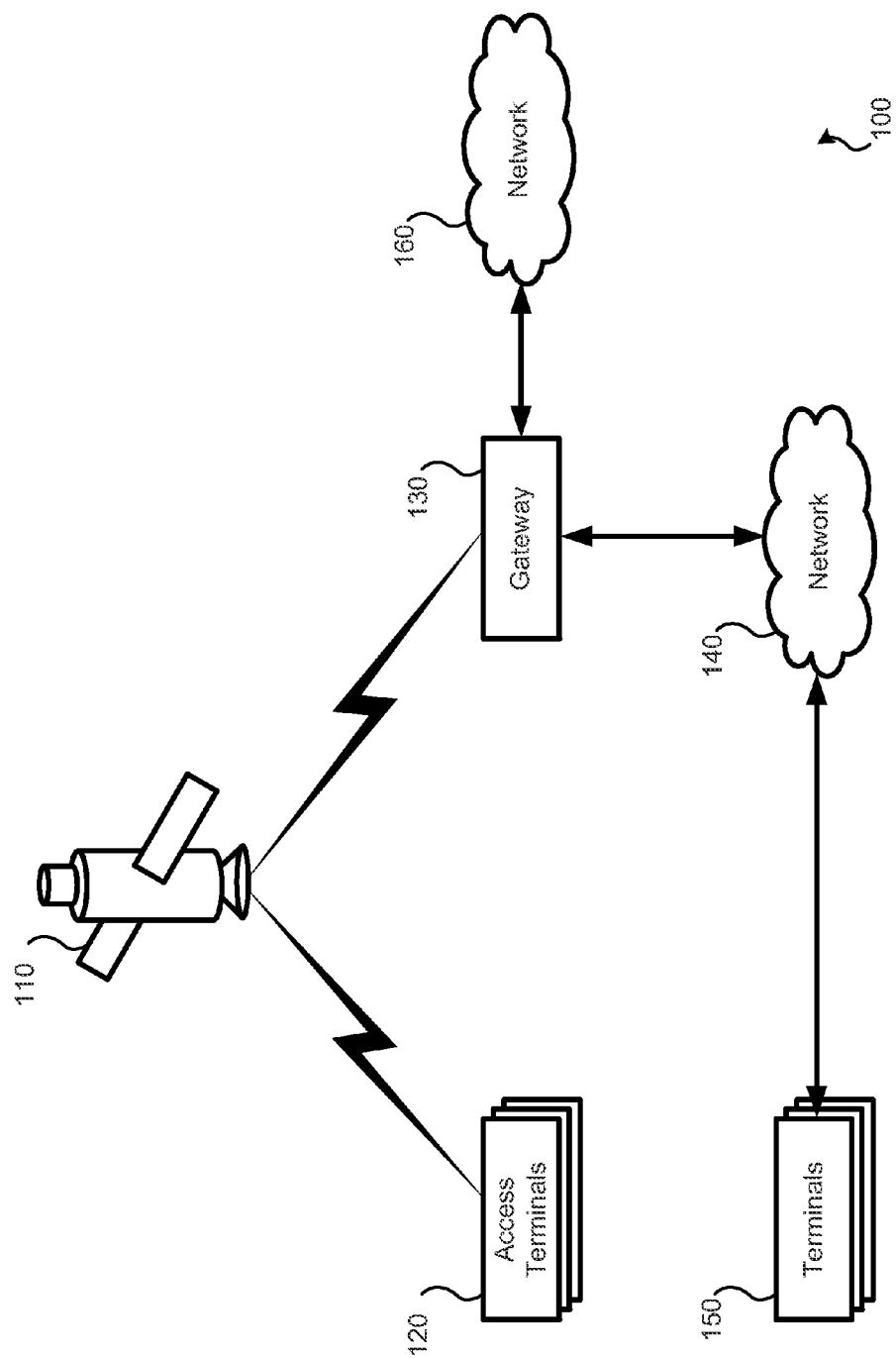
FIG. 1 is a block diagram of a system for satellite communications.

In some satellite communications systems, a geosynchronous satellite communicates with one or more access terminals, which may be wireless handsets. These access terminals may be used for data and/or voice communications.

Techniques described herein may be used for various wireless communications systems such as CDMA, TDMA, FDMA, and other systems. More specifically, the techniques may be applicable to a EGAL (Enhanced Geostationary Air-Link) system. The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

As mentioned above, the techniques described herein may be applicable to a EGAL-based system. Such a communications system may be based on the 3GPP2-All-IP model. At its most basic level, such a system involves an access terminal, such as a satellite telephone or wireless handset, communicating with a gateway, with communications between the gateway and the access terminal being relayed by a satellite. Transmissions from the gateway to the access terminal may be referred to as the forward link, while transmissions from the access terminal to the gateway may be referred to as the reverse link. The reverse link may employ a narrowband physical layer with frequency division multiplexing of multiple access terminals.

On such a EGAL-based system, an access terminal may be able to transmit data to the gateway at speeds in the vicinity of 2.4 kbps to 9.6 kbps. Increasing the power level of the data packets (which may contain voice data and/or binary data) transmitted from the access terminal and possibly using a high-gain antenna may result in higher data rates, possibly in the vicinity of 19.2 kbps to 38.4 kbps. An access terminal may be assigned one or two channels (resulting in bandwidth of 6.4 kHz or 12.8 kHz, respectively) to transmit data to the gateway via the satellite.

An access channel may be used by the access terminal to initiate communication with the gateway via the satellite. Another channel, referred to as a traffic channel, may be used to transmit data and signaling information from the access terminal to the gateway via the satellite.

In some satellite communications systems, the power level and data rate of the signal transmitted by the access terminal is calculated based on a signal received from the satellite. Such arrangements may be referred to as open loop systems. In such arrangements, the handset evaluates the strength of the signal received from the satellite. This examination of the strength of the satellite's signal may involve analyzing header information received in a packet of data from the satellite. Based on the strength of the received signal and/or the header information, the access terminal may determine how strong a signal it should use to transmit a data packet via the reverse link to the satellite. Such an arrangement may work efficiently when the channel that the satellite transmits to the access terminal (the forward link) has a similar loss profile to the channel the access terminal uses to transmit to the satellite (the reverse link).

On other satellite communications systems, (e.g., a EGAL-based system), feedback may be provided to the access terminal. Such arrangements may be referred to as closed loop systems. In such systems, the gateway, via the satellite, may notify the access terminal when an increase or decrease in the handset's outputted power level and/or data rate should occur. While such an arrangement may result in the handset outputting a power level more commensurate with the power level needed to adequately transmit data packets to the satellite, such closed loop systems require data to be transmitted from the satellite to the handset. This may result in increased overhead and a reduced amount of other data (such as voice data) being transmitted to the access terminal. For example, if five bits of a data packet (a data packet may contain voice data and/or other binary data) are necessary to be dedicated in each forward link data packet to notify the handset of whether to increase or decrease power, this may translate to a decrease of five bits of voice data per data packet that may be transmitted to the access terminal. Further, some additional number of bits may be used to notify the access terminal of the appropriate data rate to use. Indeed, in some systems, entire data packets may be dedicated to sending such power and data rate information. Again here, this may result in increased overhead with a corresponding decrease in the amount of data that may be transmitted via the forward link to the access terminal.

In the techniques described herein, control data (possibly a single variable, which may be one bit) transmitted via the forward link, may be used to control the access terminal's data rate and power level used. Such an arrangement may be used to lessen or minimize the amount of overhead used for such feedback to the access terminal, while still allowing for a closed loop system where the access terminal is notified when its transmit power level and/or data rate should be adjusted.

In one example, the gateway and satellite (collectively referred to as the "network") have the ability to send one of two messages in each data packet to the access terminal: 1) increase power ("power up"); or 2) decrease power ("power down"). For example, if such messages are sent using a single bit, a zero may indicate that power level outputted by the access terminal should be increased, while a one may indicate that the power level outputted by the access terminal should be decreased. Based upon whether the access terminal receives a "power up" or "power down" command, the access terminal may: 1) increase the power level of reverse link transmissions; 2) decrease the power level of reverse link transmissions; 3) increase the data rate of reverse link transmissions; and/or 4) decrease the data rate of signals to be transmitted to the satellite. Whether the access terminal adjusts the power level and/or the data rate of the reverse link (possibly in the form of data packets) may depend on various conditions, such as what power level the access terminal is currently using to transmit via the reverse link, how much headroom the power amplifier of the access terminal has available, and what data rate the access terminal is currently using to transmit via the reverse link.

FIG. 1 illustrates an example of a satellite communications system 100. System 100 includes a satellite 110. Satellite 110 may be in geosynchronous orbit. System 100 may also use low earth orbit satellite-based systems that are not in geosynchronous orbit. Satellite 110 may be in communication with access terminals 120. Access terminals 120 may include devices such as satellite telephones, traffic terminals, user terminals, and/or gateways. Access terminals 120 may be scattered in various locations near the earth's surface. Satellite 110 may only be able to communicate with access terminals 120 located on certain areas of the earth's surface. Satellite 110 may communicate with one or more other satellites (not pictured).

Satellite 110 may have a single beam or multiple beams to communicate with access terminals 120, and other entities, such as gateway 130. Each beam may support a number of access terminals 120. Further, these beams may not overlap or may have varying amounts of overlap. Alternatively, a beam may be used for communication with another satellite. Satellite 110 may allow multiple terminals of access terminals 120 to communicate with each other. For example, two access terminals of access terminals 120 may communicate with each other directly via satellite 110. The protocol used to communicate between the access terminal and the satellite may be EGAL, such as previously described.

The power level and data rate of signals transmitted between access terminals 120 and satellite 110 may vary depending on factors such as the strength of the signal received at satellite 110. The power level and data rate of individual access terminals of access terminals 120 may vary from each other. For example, one access terminal of access terminals 120 communicating with satellite 110 over a clear channel may use a lower power level and higher data rate than another access terminal of access terminals 120 communicating with satellite 110 over a less clear channel.

Satellite 110 may communicate with gateway 130. Gateway 130 may provide control signals to satellite 110 and receive feedback and/or diagnostic information from satellite 110. Gateway 130 may be located at some terrestrial site. Gateway 130 may link satellite 110 (and access terminals 120 that communicate with satellite 110) to other terminals and networks. Gateway 130 may communicate with one or more other networks. For example, network 140 may represent one or more terrestrial communication networks. Such networks may represent wireless (e.g., a cellular network) or wired networks (e.g., a plain old telephone system or a corporate internet), that communicate with some number of terminals 150. These terminals may also include devices such as satellite telephones, traffic terminals, user terminals, and/or gateways.

Gateway 130 may also communicate with one or more other networks, such as network 160. Network 160 may represent a public network, such as the Internet, or a private network such as a corporate local area network. Network 160 may allow for other devices connected to network 160 to communicate with one or more of access terminals 120 via satellite 110 and gateway 130.

One or more computing devices may be connected locally (e.g., a LAN, with wired or wireless connectivity) with an access terminal of access terminals 120. Data (including voice data) and information, such as data packets, may be sent from such a connected device through an access terminal of access terminals 120 and the satellite 110, to another access terminal of access terminals 120 or a terminal of terminals 150. A variety of physical layer transmission modulation and coding techniques may be used on links between the satellite 110 and an access terminal of access terminals 120 or a terminal of terminals 150 (or some other satellite). Different multiplexing schemes may be used as well, including Multi-Frequency Time-Division Multiple Access ("MF-TDMA"), TDMA, Frequency Division Multiple Access ("FDMA"), Orthogonal Frequency Division Multiple Access ("OFDMA"), Code Division Multiple Access ("CDMA"), or any number of hybrid or other schemes known in the art. In some examples, the physical layer techniques may be the same, or different, for downstream and upstream links between the satellite 110 and access terminals 120 (or some other satellite).

Gateway 130 may communicate with access terminals 120 via satellite 110 using data packets. Some or all of these data packets may contain information that indicates whether data packets received by satellite 110 were at, above, or below some threshold value for signal strength (or according to some other process for determining whether the signal strength of the access terminal of access terminals 120 should be increased or decreased). In response to whether a received data packet is above or below the threshold, gateway 130 may transmit control data to the corresponding access terminal of access terminals 120 indicating whether it should "power up" or "power down" future reverse link transmission. The control data may be in the form of a variable contained in each data packet transmitted from gateway 130 to each access terminal of access terminals 120. This variable may be only one bit in size. Therefore, if one bit in size, the control data may only indicate two states, such as: "power up" and "power down." Upon receiving this control data as part of a data packet, the access terminal of access terminals 120 may determine how, if at all, to adjust its reverse link data rate and/or power level.

Figure 2:
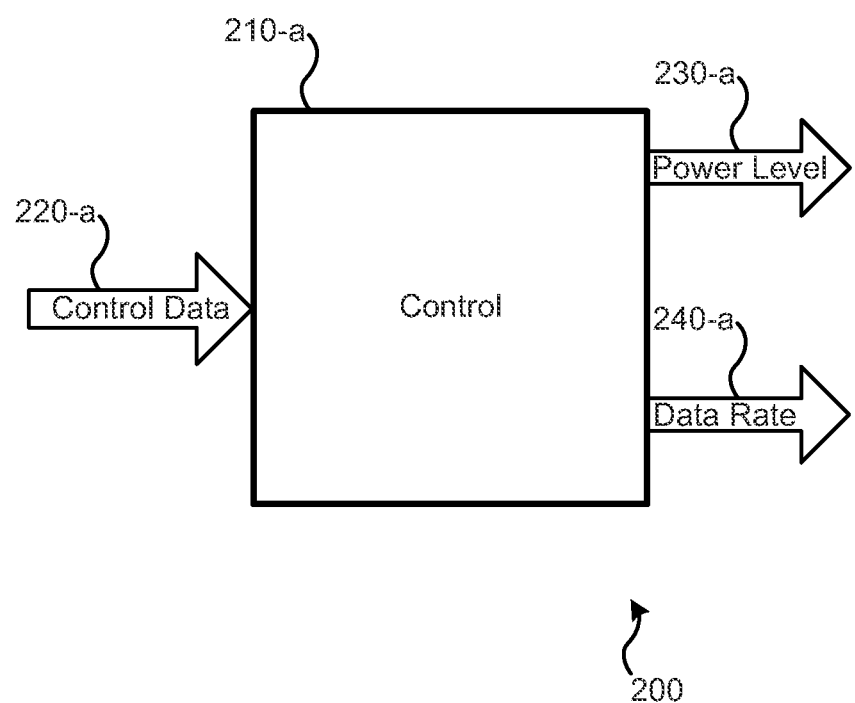
FIG. 2 is a block diagram of a system for determining a power level and data rate of a transmitted signal.

FIG. 2 illustrates a system 200 that may be present in an access terminal to determine the power level and data rate to use for a reverse link transmission. Such a system 200 may also be used in some other system. For example, system 200 may be used in system 100 of FIG. 1 in an access terminal of access terminals 120 for communication between an access terminal of access terminals 120 and satellite 110. Alternatively, system 200 may be used in a different communications system from system 100 of FIG. 1.

Control 210-*a* may receive control data 220-*a*. Control 210-*a*, at least partially based on control data 220-*a*, may create two output signals: power level signal 230-*a* and data rate signal 240-*a*. Control 210-*a* may include one or more processors. Control 210-*a* may also include the use of other circuitry, such as logic gates and/or computer-readable storage devices. Control data 220-*a* may be a variable received from a gateway (such as gateway 130 of FIG. 1), via a satellite, such as satellite 110 of FIG. 1. Control data 220-*a* may have undergone other processing before being received by control 210-*a*. For example, control data 220-*a* may have been received in a data packet from a satellite and extracted from the data packet. Such a data packet may also contain other information, such as voice, video, or file data. Control data 220-*a* may be several bytes in size, or may be a single bit. If control data 220-*a* is a single bit, it only provides two possible states, such as: "power up" (possibly represented by 1) and "power down" (possibly represented by −1). Based on whether a "power up" or "power down" command is received as control data 220-*a*, control 210-*a* may determine the appropriate power level (which is output by control 210-*a* through power level signal 230-*a*) and data rate (which is output by control 210-*a* through data rate signal 240-*a*) for a reverse link transmission.

Power level signal 230-*a* and data rate signal 240-*a* may be sent to a transmitter device. Power level signal 230-*a* and data rate signal 240-*a* may be analog signals or binary data transmitted to another device, such as a transmitter. Power level signal 230-*a* and data rate signal 240-*a* may represent a serial data transmission. For example, a data packet transmitted from control 210-*a* to a transmitter may contain both the power level signal 230-*a* and data rate signal 240-*a*. The power level signal 230-a and data rate signal 240-a may also be sent to different devices. Further, power level signal 230-a and/or data rate signal 240-a may be transmitted to circuits that are part of the same device or a different device from control 210-a.

A transmitter may be responsible for transmitting data packets to a satellite, such as satellite 110 of FIG. 1. When control data 220-a is received, control 210-a may have stored the previous power level and previous data rate used for transmitting one or more previous packets. Based on whether a "power up" or "power down" signal is received as control data 220-a, the power level signal 230-a, data rate signal 240-a, or both, may indicate an adjustment to the power level and/or data rate used to transmit data packets to the gateway.

Figure 3:
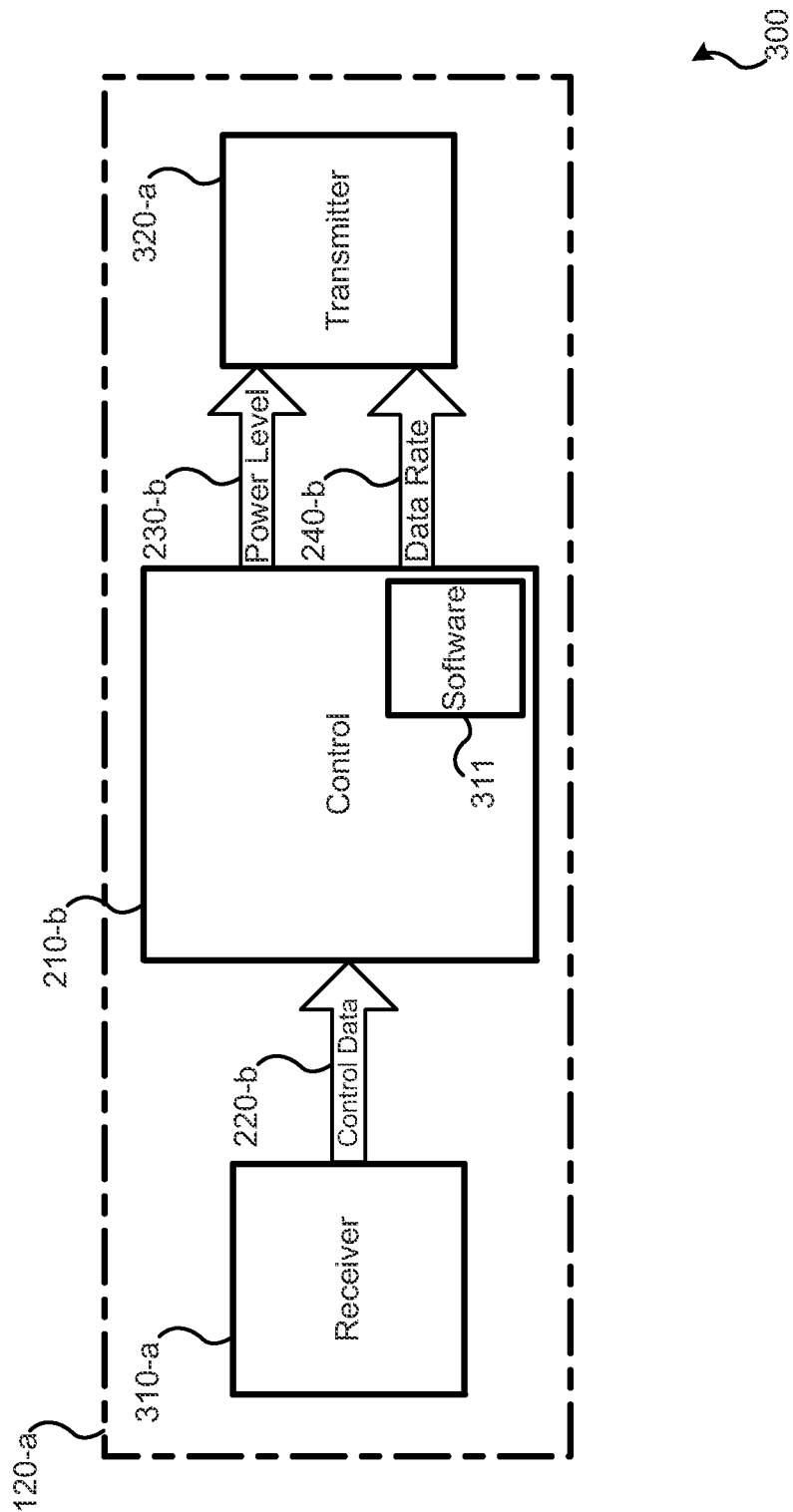
FIG. 3 is another block diagram of a system for determining a power level and data rate of a transmitted signal.

FIG. 3 illustrates a system 300 that determines a power level and data rate of a transmission to be transmitted via a reverse link to a gateway. System 300 may represent the same system as processing system 200 of FIG. 2. System 300 may be part of an access terminal, such as access terminal 120-a of access terminals 120 of FIG. 1. Alternatively, access terminal 120-a may not be part of access terminals 120. A data packet sent via the forward link from a gateway to the access terminal via a satellite may be received by receiver 310-a. Receiver 310-a may decode the forward link data packet. Control data 220-b (which may represent the same control data as control data 220-a), may be a variable that indicates whether gateway 130 has requested a "power up" or "power down" of the reverse link signal transmitted by transmitter 320-a of access terminal 120-a. Based upon control data 220-b (which may be a single bit) and the previous power level and data rate used to transmit data packets to the satellite, control 210-b may determine a new power level and/or data rate for at least one data packet transmitted to the satellite.

As previously briefly mentioned, control 210-b may use a series of instructions to determine whether the power level and/or data rate of data packets transmitted via the reverse link should be adjusted. These instructions may be embodied in software 311. Software 311 may be stored on a computer-readable storage device, such as random access memory or a hard drive, and executed by a processor. These instructions may involve determining available power amplifier headroom (alternatively referred to as "PA headroom"). PA headroom refers to the difference between the current power level of the power amplified and the maximum power that the power amplifier (part of transmitter 320-a) can output to transmit data packets via the reverse link. Therefore, the greater the PA headroom, the lower the power level being used by transmitter 320-a to transmit data packets to a satellite. Control 210-b may also compute an averaged PA headroom. An averaged PA headroom may refer to the average PA headroom over a certain period of time, such as the last eight data packets transmitted via the reverse link.

When a "power up" command is received by the access terminal from a satellite, an exemplary set of instructions executed by control 210-b includes: 1) determining whether transmitter 320-a is already transmitting at its maximum power level; 2) determining whether transmitter 320-a is not transmitting at the lowest available data rate; 3) determining whether transmitter 320-a has transmitted at a current data rate longer than a hold time threshold; and 4) determining whether the averaged PA headroom is less than a constant threshold value (possibly 0.5 dB). If all of these conditions are met, control 210-b may transmit data rate signal 240-b that indicates the data rate of data transmitted by transmitter 320-a is to be decreased to the next lower data rate. In another exemplary system, more or fewer instructions are used to determine whether the data rate of data transmitted via the reverse link should be decreased, or kept constant. If a "power up" command is received, but the above four instructions are not satisfied, the data rate may remain the same.

The averaged PA headroom and PA headroom discussed above may be computed according to the following formulas:

$$\text{avg\_pa\_headroom}(n) = (1-\beta)*\text{avg\_pa\_headroom}(n-1) + \beta*\text{pa\_headroom}(n); \quad \text{Eq. 1}$$

$$\text{pa\_headroom}(n) = \text{MAX\_PWR} - T(n). \quad \text{Eq. 2}$$

The filter coefficient $\beta$ may be set to $\frac{1}{8}$. The power amplifier headroom ("pa_headroom") may be determined by subtracting the transmit power level at the n instant (T(n)) from the maximum power of the transmitter ("MAX_PWR").

Instructions, such as the four instructions noted above, may serve varying purposes. For example, the first instruction may be necessary because if a "power up" command is received, and transmitter 320-a is already operating at its maximum power level, increasing the power level of transmitter 320-a might not be possible. The second instruction may serve the purpose of determining whether it is possible to decrease the data rate of the reverse link. The third instruction, involving the use of a hold time threshold, may be necessary due to the latency of communicating with a satellite. For example, data packets already transmitted to a (geosynchronous) satellite may not have been received by the gateway before some other data packet containing a "power up" or "power down" command was transmitted to access terminal 120-a. Therefore, before adjusting the data rate, it may be necessary to wait a period of time (the hold time threshold) to ensure the data rate is not being adjusted overly frequently.

If it is determined that the data rate of data packets transmitted by transmitter 320-a is to be decreased to the next lower data rate, the power level to transmit the reverse link signal may also be adjusted. While many different formulas may be used to determine the power level by control 210-b, in system 300, control 210-b uses the following formula:

$$T(n+1) = T(n) + \kappa(r(n+1)) - \kappa(r(n)) + \text{Rate\_Down\_Power\_Mgn} \quad \text{Eq. 3}$$

In this formula, T(n) represents the power level at the nth instant, T(n+1) represents the power level at the n+1 instant, r(n) represents the data rate of a received frame at the nth instant, r(n+1) represents the data rate of a received frame at the n+1 instant, $\kappa$ represents the adjustment on the power level based on the data rate, and "Rate_Down_Power_Mgn" represents a fixed amount, such as 1 dB, to adjust the power level by. Therefore, the power level of the next frame transmitted by transmitter 320-a may be set to the power level of the current frame transmitted by transmitter 320-a plus the adjustment on the power level based on the data rate of the next frame, minus the adjustment on the power level based on the data rate of the current frame, plus the rate_down_power_mgn amount.

The values of $\kappa(\ )$ may be predetermined and stored by control 210-b in a lookup table. For example, in exemplary system 300, $\kappa(n)$ may be represented by the values presented in Table 1.

TABLE 1

| Number of Channels | Data Rate [kbps] | κ[dB] |
|---|---|---|
| 1 | 2.4 | 0 |
|  | 4.8 | 4.5 |
|  | 9.6 | 12 |

TABLE 1-continued

| Number of Channels | Data Rate [kbps] | κ[dB] |
|---|---|---|
| 2 | 2.4 | −2 |
|  | 4.8 | 1 |
|  | 9.6 | 5.5 |
|  | 12.8 | 6.5 |
|  | 19.2 | 10 |
|  | 25.6 | 13 |
|  | 38.4 | 18 |

Alternatively, when a "power down" command is received from a satellite, a different exemplary set of instructions executed by control 210-b may be followed. These instructions may include: 1) determining whether transmitter 320-a is not transmitting at the highest available data rate; 2) determining whether transmitter 320-a has transmitted at a current data rate longer than a hold time threshold; 3) determining whether the PA headroom is greater than the extra power needed if jumping to the next higher data rate plus a fixed margin and a modulation-dependent margin; and 4) determining whether the averaged PA headroom is greater than the extra power needed if jumping to the next higher data rate plus a fixed averaged margin and a modulation-dependent margin. If all of these conditions are met, control 210-b may transmit a data rate signal 240-b that indicates the data rate of data transmitted by transmitter 320-a is to be increased to the next higher data rate. If a "power down" command is received from a satellite, but the above four instructions are not satisfied, the data rate of the reverse link signal may remain the same.

Determining whether the PA headroom is greater than the extra power needed if jumping to the next higher data rate plus a fixed margin and a modulation-dependent margin may be calculated according to the following formula:

$$\text{pa\_headroom}(n) > \kappa(r(n+1)) - \kappa(r(n)) + \text{rate\_up\_pwr\_margin} + \text{peak2avg\_margin}(r(n+1)) \quad \text{Eq. 4}$$

Equation 4 may be used to determine whether the PA headroom of the power amplifier is greater than the adjustment on the threshold (κ( )) based on the data rate (r(n)) at the n+1 instant, minus the adjustment on the threshold based on the data rate at the n instant, plus the "rate up power margin" (which here is a fixed constant of 1 dB), plus the "peak2avg_margin" of the data rate at the n+1 instant. The peak2avg_margin, representing the modulation-dependent margin, may be presented by the modulation-dependent margin presented in Table 2.

The modulation-dependent margin may vary depending on the modulation scheme employed. The following table provides an exemplary set of modulation-dependent margins based on the modulation scheme used.

TABLE 2

| Modulation | Modulation Dependent Margin |
|---|---|
| BPSK (Binary Phase-Shift Keying), QPSK (Quadrature Phase-Shift Keying), 8PSK (Phase Shift Keying with 8 phases) | 0 |
| 16 QAM (Quadrature Amplitude Modulation) | 2.55 |
| 64 QAM | 3.68 |

Determining if the averaged PA headroom is greater than the extra power needed if jumping to the next higher data rate plus a fixed averaged margin and a modulation-dependent margin may be calculated according to another equation:

$$\text{avg\_pa\_headroom}(n) > \kappa(r(n+1)) - \kappa(r(n)) + \text{avg\_pa\_hr\_up\_th} + \text{peak2avg\_margin}(r(n+1)) \quad \text{Eq. 5}$$

Therefore, it may be determined whether the average PA headroom is greater than the adjustment on the threshold based on the data rate at the n+1 instant κ(r(n+1)), minus the adjustment on the threshold based on the data rate at the n instant κ(r(n)), plus "avg_pa_hr_rate_up_th (which may be a constant, such as 0.8 dB), plus the "peak2avg_margin" of the data rate at the n+1 instant. The peak2avg_margin may be presented by the modulation-dependent margin presented in Table 2.

Instructions, such as the four instructions noted above regarding access terminal 150-a receiving a "power down" command from a gateway, may serve varying purposes. For example, the third and fourth instructions may be necessary because if a "power down" command is received, and the data rate transmitted from transmitter 320-a is to be increased, it may be necessary to ensure that there is sufficient PA headroom to increase the power level of the reverse link at the higher data rate.

If it is determined that the data rate is to be increased to the next higher data rate, the power level to transmit via the reverse link may also be adjusted. While many different formulas may be used to determine how the power level may be adjusted by control 210-b, in exemplary system 300, control 210-b uses the following equation:

$$T(n+1) = T(n) + \kappa(r(n+1)) - \kappa(r(n)) \quad \text{Eq. 6}$$

In this formula, T(n) represents the power level at the nth instant, T(n+1) represents the power level at the n+1 instant, r(n) represents the data rate of a received frame at the nth instant, r(n+1) represents the data rate of a received frame at the n+1 instant, and κ represents the adjustment on the threshold based on the data rate. Therefore, the power level of the next frame transmitted by transmitter 320-a may be equal to the power level of the current data packet transmitted by transmitter 320-a plus the adjustment on the threshold based on the data rate of the next data packet, minus the adjustment on the threshold based on the data rate of the current frame.

If no data rate change is to occur for the next data packet to be transmitted (e.g., the conditions previously described regarding when the data rate may be increased or decreased have not been satisfied), the power level of the transmitter 320-a may still be adjusted. The power level may be adjusted according to:

$$T(n+1) = \begin{cases} \text{MAX\_PWR} & \text{if} \quad T'(n+1) > \text{MAX\_PWR} \\ T'(n+1) & \text{if} \quad \text{MIN\_PWR} \leq T'(n+1) \leq \text{MAX\_PWR} \\ \text{MIN\_PWR} & \text{if} \quad T'(n+1) < \text{MIN\_PWR} \end{cases} \quad \text{Eq. 7}$$

$$\text{where } T'(n+1) = T(n) + \delta * \tilde{C}(n) \quad \text{Eq. 8}$$

In these equations, MAX_PWR may represent the maximum transmit power the power amplifier of the access terminal may output. MIN_PWR may represent the minimum transmit power the power amplifier of the access terminal may output. δ may represent a power control step size, such as 0.5 dB. $\tilde{C}(n)$ may represent the command (e.g., "power up" or "power down") received by the access terminal from the gateway via the satellite (possibly in the form of 1 ("power up") or −1 ("power down")).

Therefore, it may be possible that both the data rate and power level of the reverse link may not be adjusted despite receiving a "power up" or "power down" command. For instance, if the conditions for a data rate change are not present, the above equations may be evaluated to determine how to adjust the power level. If the power level is already at minimum or maximum, depending on the calculated value of T', the power level may remain at the minimum or maximum available power level.

Figure 4:
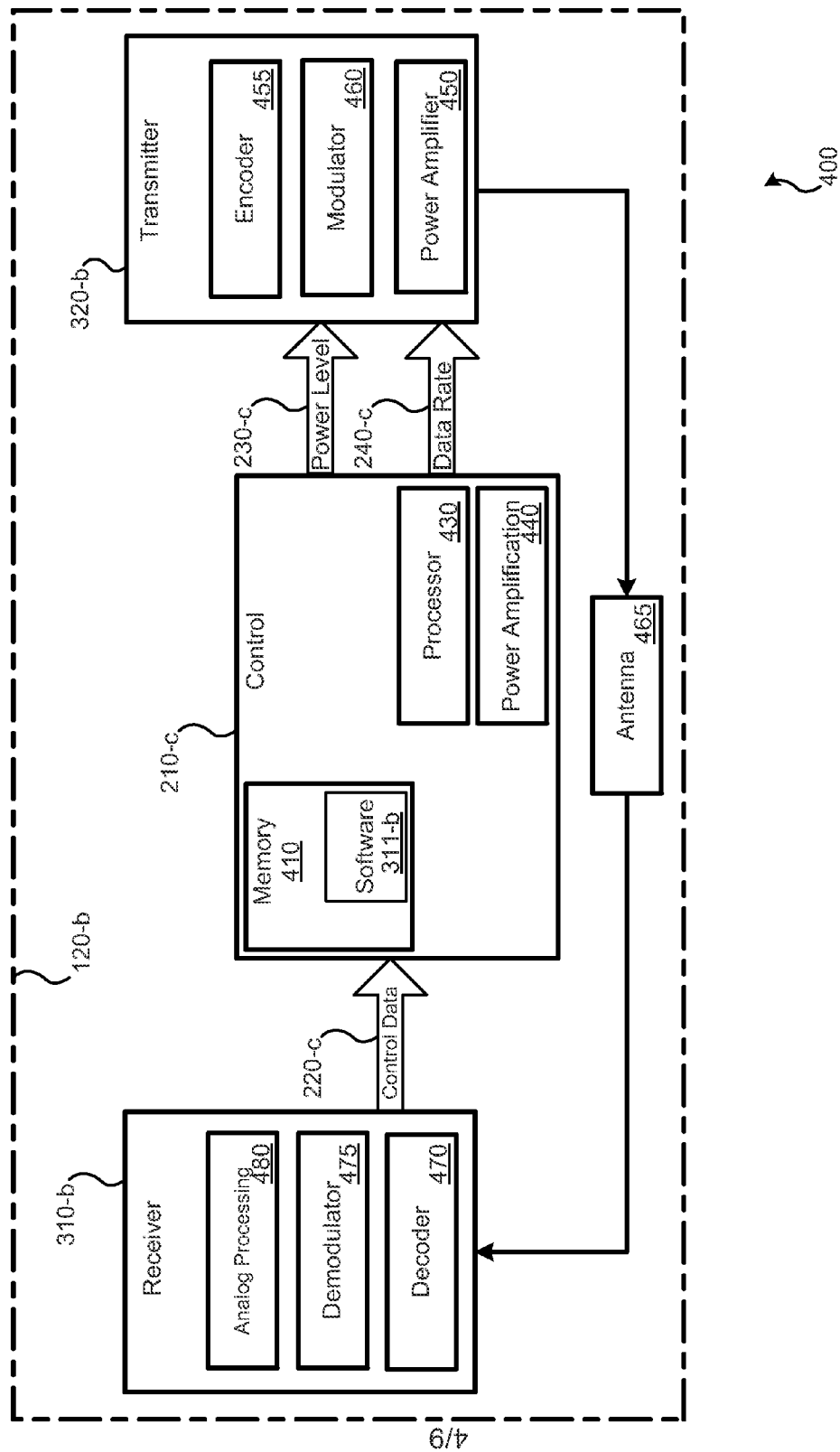
FIG. 4 is another block diagram of a system for determining a power level and data rate of a transmitted signal.

FIG. 4 illustrates another example 400 of an access terminal 120-b. Control 210-c may represent the same control stage as control 210-b of FIG. 3. Additionally, control 210-c may include computer-readable memory 410, which may store software 311-b. Software 311-b may comprise the instructions necessary for control 210-c to determine whether and by how much to adjust the data rate and power level of transmitter 320-b based on control data 220-c. Control 210-c may also comprise a processor 430 and power amplification 440. Power amplification 440 may communicate with power amplifier 450 to determine the maximum power level, minimum power level, and current power level of power amplifier 450. Alternatively, the maximum power level, minimum power level, and/or current power level may be computed and/or stored at control 210-c and power amplification 440 may be unnecessary.

Control 210-c may output power level signal 230-c and data rate signal 240-c to some other device. Transmitter 320-b, which may represent the same transmitter as transmitter 320-a, may receive power level signal 230-c and data rate signal 240-c. Transmitter 320-b may include an encoder 455, a modulator 460, and power amplifier 450. Transmitter 320-b may use power level signal 230-c and data rate signal 240-c to encode, modulate, and transmit a reverse link data packet at the power level and data rate indicated by power level signal 230-c and data rate signal 240-c. The data packet may be transmitted via antenna 465 to the network.

Antenna 465 may also receive data packets transmitted to the access terminal 120-b from the network. Receiver 310-b, which may represent the same receiver as receiver 310-a, may receive these forward link data packets via antenna 465. Receiver 310-b may include decoder 470, demodulator 475, and analog processing 480. Receiver 310-b may demodulate and decode the received data packet. The data packet may also require analog processing. The control data, which may indicate one of two commands (e.g., "power up" or "power down"), may be transmitted as control data 220-c to control 210-c. Control data 220-c may represent the same control data as control data 220-b.

Figure 5:
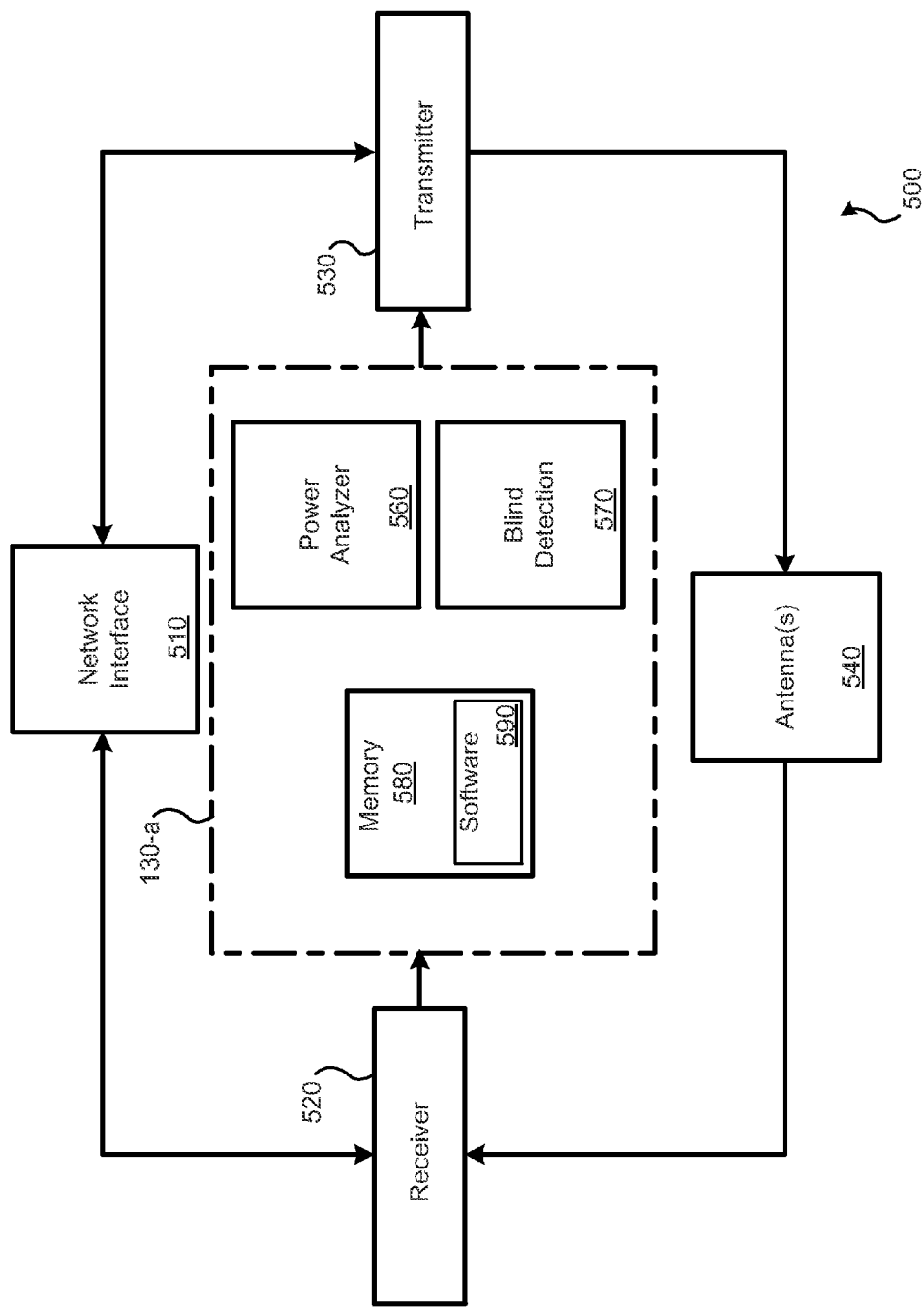
FIG. 5 is a block diagram of a gateway.

Access terminal 120-a and/or access terminal 120-b may communicate with a gateway via a satellite. FIG. 5 illustrates a gateway system 500. Gateway 130-a, which may represent the same gateway as gateway 130, modulates and transmits data packets to access terminals via a satellite. Gateway 130-a may transmit and receive voice communications via network interface 510 with other networks and terminals. Gateway 130-a may also communicate with a receiver 520 and a transmitter 530. Receiver 520 may receive data packets from an access terminal via antenna 540. Transmitter 530 may send data packets to an access terminal via antenna 540.

Gateway 130-a may determine whether a "power up" or "power down" command should be transmitted to an access terminal. Whether a "power up" or "power down" command is transmitted to an access terminal may be based on factors such as a comparison of the power level of a data packet received by the satellite from the access terminal to a threshold power level. Such a power analysis may be conducted by power analyzer 560. Further, because an access terminal may vary the data rate of data packets transmitted to gateway 130-a, gateway 130-a may need to detect the incoming data rate from an access terminal blindly. This may be performed by blind detection 570. Blind detection 570 may have the ability to determine the data rate of data packets (including data packets that include voice data) received from an access terminal. Further, gateway 130-a may include computer-readable memory 580, which may store software 590. Software 590 may include instructions that, when executed, determine whether control data transmitted to an access terminal (such as the access terminals of FIGS. 1-4) should include a "power up" or "power down" command.

Figure 6:
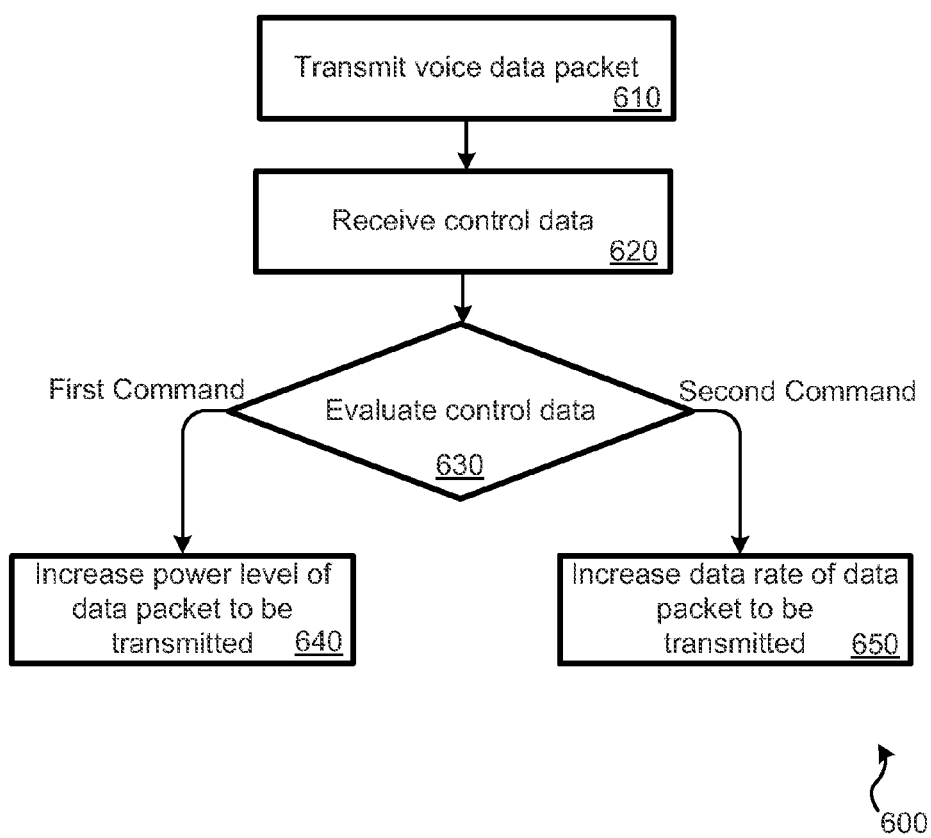
FIG. 6 is a flowchart of a method for determining a power level and data rate for a signal to be transmitted from an access terminal to a gateway via satellite.

The previously described gateways, satellites, and access terminals of FIGS. 1-5 may be used to perform a method, such as method 600 of FIG. 6. At stage 610 of method 600, a data packet may be transmitted by an access terminal, such as access terminal 120-a or 120-b of FIGS. 1-3, respectively. This data packet may be transmitted at a data rate and power level as determined based on previous control data received from a gateway (such as gateway 130 or 130-a). Alternatively, the data packet transmitted at stage 610 may use a predetermined data rate and predetermined power level for data packets, at least until it begins to receive control data from the gateway. For example, the predetermined data rate may be 2.4 kbps (possibly the lowest available), and the power level may be the maximum power level of the access terminal's power amplifier.

The access terminal may receive control data from the gateway via a satellite at stage 620. The control data may be in the form of one or multiple variables. The control data may be a single bit. The control data may be received as part of a data packet by the access terminal. Control data may be present in each data packet received by the access terminal. The control data may indicate one of two commands: "power up" or "power down." The control data received by the access terminal at stage 620 may be at least partially in response to the data packet transmitted at stage 610. It should be understood that other data packets may have been transmitted (and received) by the access terminal between stage 610 and the control data being received at stage 620.

At stage 630, the control data received by the access terminal may be evaluated. Depending on whether a first command or a second command is present in the control data, the access terminal may perform a different next stage.

If a first command is received, stage 640 may be performed. The first command received from the gateway may be a "power up" command. At stage 640, the power level of the data packet to be transmitted may be increased. Also, the data rate of the data packet to be transmitted may be decreased. The power level increase at stage 640 may be calculated in accordance with the previously described equation 7 and equation 8 if the data rate is unchanged. Alternatively, some other power level calculations may be conducted.

If, instead, a second command is received, stage 650 may be performed. The second command received from the gateway may be a "power down" command. At stage 650, the data rate of the data packet to be transmitted to the gateway may be increased to the next higher data rate of the access terminal. Also, the power level of the data packet to be transmitted may be increased or decreased. Any change in power level of the data packet to be transmitted may be determined by equation 6 following the data rate being increased.

Figure 7A:
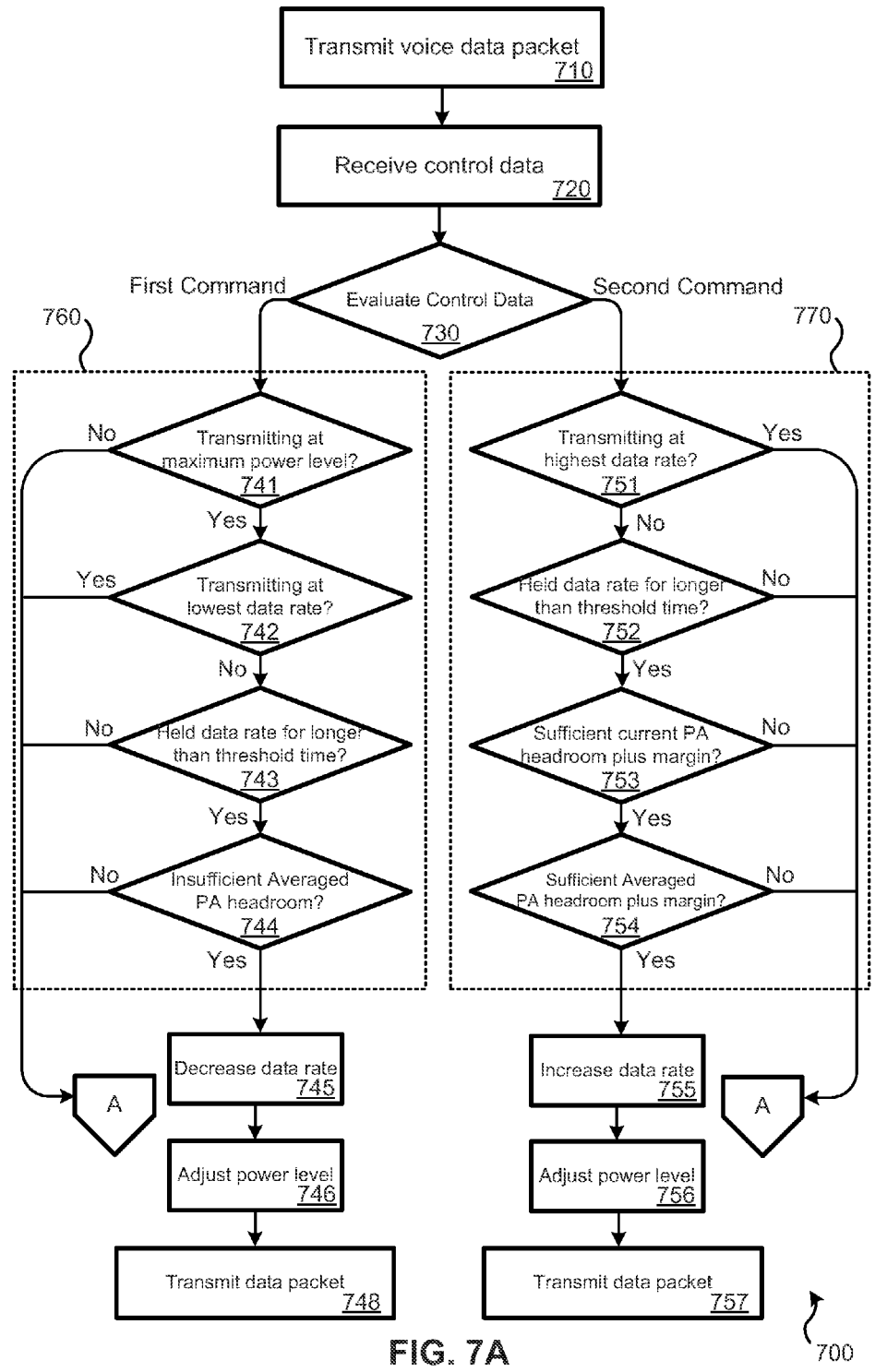
FIGS. 7A and 7B are flowcharts of a method for determining a power level and data rate for a signal to be transmitted from an access terminal to a gateway via a satellite.
Figure 7B:
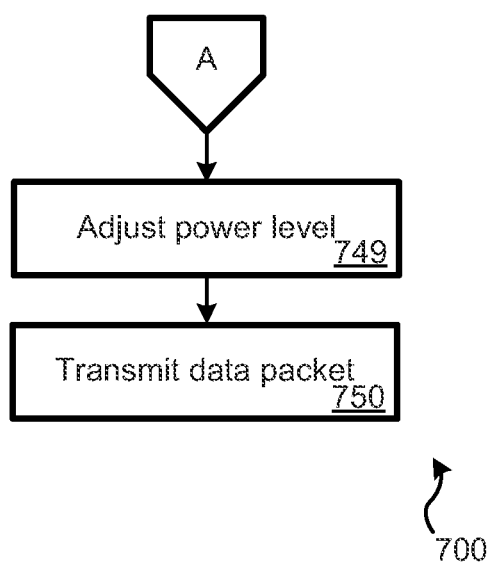

While in method 600, the power level and data rate are adjusted based on only the control data evaluated at stage 630, other conditions may also be evaluated. Method 700 of FIGS. 7A and 7B represents a method for determining whether to adjust the power level and/or data rate of a data packet to be transmitted from an access terminal. Method 700 may use an access terminal, such as described in relation to FIGS. 1-4.

At stage 710, a data packet may be transmitted from the access terminal to a gateway via a satellite. At stage 720, in response to the data packet transmitted at stage 710, control data may be received by the access terminal from the gateway via the satellite. As described in relation to method 600, control data may be one or more variables, or a single bit of data. The control data may be transmitted as part of a data packet. Such control data may be present in every data packet transmitted from the gateway to the access terminal via the satellite. At stage 730, the control data received by the access terminal may be evaluated. Evaluating the control data may involve determining whether a first command, such as a power up command, or a second command, such as a power down command, is present. If the evaluated control data includes the first command, a first set of conditions 760 may be evaluated. If the evaluated control data includes the second command, a second set of conditions 770 may be evaluated.

When the first command is received, the first set of conditions 760 may be evaluated. As presented in FIG. 7A, the first set of conditions 760 contains four conditions. Different numbers of conditions may be present in other examples. At stage 741, it may be determined whether the power amplifier of the access terminal's transmitter is operating at its maximum power level. At stage 742, it may be determined whether the access terminal is transmitting at its lowest data rate. At stage 743, it may be determined whether the current data rate has been held for longer than a threshold period of time. At stage 744, it may be determined whether there is insufficient averaged power amplifier headroom. To evaluate stage 744, averaged PA headroom, which may be determined by equation 1, may be compared with a fixed threshold. Alternatively, some other equation may be used to determine whether sufficient averaged PA headroom is available. If all four of these conditions (at stages 741, 742, 743, and 744) are satisfied, the data rate of the data packet to be transmitted to the gateway via the satellite may be decreased at stage 745. At stage 745, the data rate may be decreased to the next lower data rate. At stage 746, the power level of the data packet to be transmitted to the gateway may be adjusted. The power level may be adjusted according to equation 3. Alternatively, the power level may be adjusted according to some other equation or predefined table. At stage 748, the data packet with the decreased data rate and adjusted power level may be transmitted to the gateway via the reverse link.

If the first command was evaluated to be present in control data at stage 730, and if at least one condition of the first set of conditions 760 was found to be invalid, the method may proceed to stage 749 (illustrated in FIG. 7B) instead of stage 745. At stage 749, the access terminal may adjust the power level of the data packet to be transmitted to the gateway via the satellite. The power level may be adjusted at stage 749 in accordance with equations 7 and 8. Alternatively, some other equation or equations, or a predefined table, may be used to determine how the power level should be adjusted. At stage 750, the data packet may be transmitted at the power level determined at stage 749.

Returning to stage 730, if the control data is evaluated to contain the second command as opposed to the first command, the second set of conditions 770 may be evaluated. The second command may be a command that indicates a "power down" command. As with the first set of conditions 760, the second set of conditions 770 contains four conditions. It may be possible for fewer or more conditions to be present in the second group of conditions 770.

At stage 751, it may be determined whether the access terminal is transmitting at its highest data rate. At stage 752, it may be determined whether the data rate has remained constant for longer than a threshold period of time. At stage 753 it may be determined whether there is sufficient power amplifier headroom plus a certain amount of margin. To determine whether sufficient current PA headroom plus some margin are present, equation 4 may be used. Alternatively some other equation may be used. PA headroom may be calculated in accordance with equation 2. Alternatively, some other equation may be used to determine whether sufficient PA headroom plus a certain amount of margin is present. At stage 754, it may be determined whether sufficient averaged PA headroom is present. Equation 5 may be used to determine whether sufficient averaged PA headroom is present. Alternatively, some other equation may be used. Average PA headroom may be calculated using equation 1. Alternatively, some other equation may be used to determine whether sufficient averaged PA headroom is present.

If all of these conditions are met, at stage 755, the data rate that the access terminal will use to transmit a data packet to the gateway via the satellite may be increased. The data rate may be increased to the next higher data rate. At stage 756, the power level to be used to transmit the data packet at the increased data rate may be determined. The power level may be calculated using equation 6. Alternatively, some other equation or table may be used to determine the power level at which to transmit the data packet. At stage 757, the data packet may be transmitted at the increased data rate and adjusted power level to the gateway via the satellite.

If the second command was evaluated to be present in control data at stage 730, and if at least one condition of the second set of conditions 770 was found to be invalid, the method may proceed to stage 749 (illustrated in FIG. 7B) instead of stage 755. At stage 749, the access terminal may adjust the power level of the data packet to be transmitted to the gateway via the satellite. The power level may be adjusted at stage 749 in accordance with equations 7 and 8. Alternatively, some other equation or equations, or a predefined table, may be used to determine how the power level should be adjusted. At stage 750, the data packet may be transmitted at the power level determined at stage 749.

Whether the data packet is transmitted to the gateway via the satellite at stage 748, 757, or 750, the method may repeat for each data packet transmitted via the reverse link from the access terminal to the gateway. For example, the control data received at stage 720 may be received as part of each data packet received at the access terminal.

Figure 8:
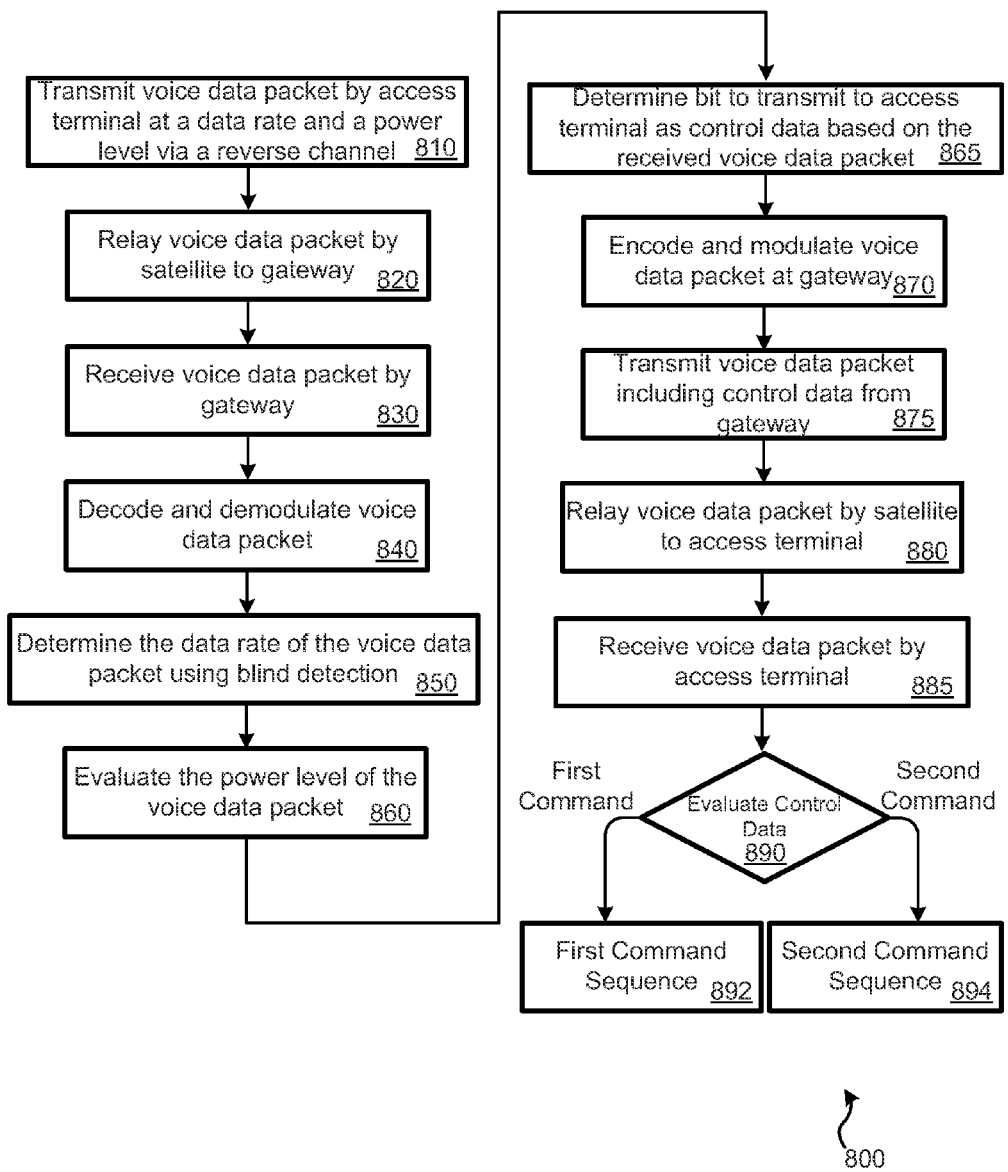
FIG. 8 is a flowchart of a system-wide method for determining a power level and data rate for a signal to be transmitted.

While FIGS. 7A and 7B illustrate a method for an access terminal to adjust its transmitted data rate and power level, FIG. 8 illustrates a system-wide method 800, including stages performed by an access terminal, satellite, and a gateway. At stage 810, an access terminal may transmit a data packet at some data rate and power level. This data rate and power level may be based on previous control data received from the gateway. Alternatively, this data rate and power level may be based on some initial, predetermined data rate and power level. Such a predetermined data rate and power level may be used whenever the access terminal initiates communication with the gateway. At stage 820, the data packet may be relayed to the gateway by the satellite. At stage 830, the data packet may be received by the gateway.

The gateway may decode and/or demodulate the received data packet at stage 840. At stage 850, the blind detection may be performed by the gateway to determine the data rate of the data packet received from the access terminal. At stage 860, the power level of the data packet received by the gateway from the access terminal may be evaluated. This may include comparing the power level of the received data packet to a threshold value or determining a quality of service based on a determination of lost data packets. At stage 865, the control data to be transmitted to the access terminal may be determined. Whether the bit to be transmitted to the access terminal indicates a power up command or a power down command may depend on the evaluation of the power level of the received data packet at stage 860. At stage 870, a data packet to be transmitted from the gateway to the access terminal via the satellite may be encoded and modulated. At stage 875, the data packet may be transmitted to the access terminal. This data packet may include the control data, which includes the power up command or the power down command. At stage 880, a satellite may relay the data packet received from the gateway to the access terminal.

At stage 885, the data packet including the control data may be received by the access terminal. It should be understood that between stage 810 and stage 885 other data packets may have been transmitted by the access terminal and other data packets may have been transmitted by the gateway to the access terminal via the satellite. At stage 890, the access terminal may evaluate the control data received as part of the data packet. If the control data is determined by the access terminal to contain the first command, a first command sequence stage 892 may be followed. First command sequence stage 892 may include determinations of whether various conditions have been satisfied. For example, first command sequence stage 892 may include evaluation of conditions such as the first set of conditions 760 of FIG. 7A. First command sequence stage 892 may also include decreasing the data rate and adjusting the power level of a data packet to be transmitted via the reverse link from the access terminal to the gateway via the satellite as presented in relation to FIGS. 7A and 7B.

Alternatively, at stage 890, when the control data is evaluated, and it is determined to contain the second command, a second command sequence may be followed at stage 894. Second command sequence stage 894 may include determinations of whether various conditions have been satisfied. These conditions may be different from the conditions in the first command sequence stage 892. For example, a second command sequence stage 894 may include evaluation of conditions such as the second set of conditions 770 of FIG. 7A. Second command sequence stage 894 may also include increasing the data rate and adjusting the power level of a data packet to be transmitted via the reverse link from the access terminal to the gateway via the satellite as presented in relation to FIGS. 7A and 7B.

The same, or a similar, method may be performed based on each data packet transmitted from the access terminal to the gateway via the satellite, with control data being transmitted with each data packet from the gateway to the access terminal via the satellite based on each data packet received from the access terminal by the gateway.

As those with skill in the art will recognize, while the previous description and figures have been directed to a communications system involving access terminals, a gateway, and a satellite, it may be possible to apply similar principles to other forms of communication networks. For example, in a terrestrial wireless communication network, it may be possible to use similar control data to determine how some other form of access terminal (such as a typical smart phone or cell phone) should adjust its data rate and/or transmitted power level.

Considerations Regarding the Description

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing a thorough understanding of the described techniques. These techniques, however, may be practiced without these specific details. In some instances, well-known structures and devices are shown in stage diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, servers, and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates a example or instance and does not imply or require any preference for the noted example. Thus, the disclosure is not to be limited to the examples and designs described herein but is to be accorded the widest scope consistent with the principles and novel features disclosed herein.

What is claimed is:

1. An access terminal, comprising:
a transmitter module configured to transmit data packets to a gateway via a satellite;
a receiver module configured to receive, responsive to the transmitted data packets, control data generated at the gateway and transmitted from the gateway to the access terminal via the satellite; and
a control module, communicatively coupled with the transmitter module and the receiver module, and configured to:
evaluate the received control data;
if the control data comprises a first command and a first set of conditions is not satisfied, adjust a transmit power level for data packets to be transmitted from the transmitter module; and
if the control data comprises a second command different from the first command and a second set of conditions is satisfied, increase a data rate for data packets to be transmitted from the transmitter module.

2. The access terminal of claim 1, wherein the control data is a single variable.

3. The access terminal of claim 1, wherein the control data is a single bit.

4. The access terminal of claim 1, further comprising:
a power amplification module, communicatively coupled with the control module, and configured to evaluate power amplification headroom of the transmitter,
wherein the control module is further configured to determine whether the power amplification headroom is greater than a threshold level when the control data comprises the first command.

5. The access terminal of claim 4, wherein the control module is further configured to decrease the data rate for data packets to be transmitted from the transmitter if the first set of conditions is satisfied, wherein in the first set of conditions the control data comprises the first command and a determination that the averaged power amplification headroom is less than the threshold level.

6. The access terminal of claim 5, wherein the first set of conditions further comprises:
the transmitter transmitting at a maximum power level; and
the data rate is greater than a minimum data rate of the transmitter.

7. The access terminal of claim 1, wherein the control module is further configured to adjust the transmit power level for data packets to be transmitted from the transmitter module if the second set of conditions is not satisfied and the control data comprises the second command.

8. The access terminal of claim 7, wherein the second set of conditions includes a determination that the power amplification headroom is greater than a threshold level.

9. The access terminal of claim 7, wherein the second set of conditions further comprises the data rate having remained constant for longer than a threshold period of time.

10. The access terminal of claim 7, wherein the second set of conditions further comprises the data rate being lower than a maximum data rate of the transmitter module.

11. A method of power level and data rate control in a satellite communications system, the method comprising:
transmitting, from an access terminal, data packets to a gateway via a satellite;
receiving, by the access terminal, responsive to the transmitted data packets, control data transmitted by the gateway to the access terminal via the satellite;
evaluating, by the access terminal, the control data;
if the control data comprises a first command and a first set of conditions is not satisfied, adjusting, by the access terminal, a power level of data packets to be transmitted by the transmitter module; and
if the control data comprises a second command different from the first command and a second set of conditions is satisfied, increasing, by the access terminal, a data rate of data packets to be transmitted from the transmitter module.

12. The method of claim 11, wherein the control data is a single bit.

13. The method of claim 11, further comprising evaluating, by the access terminal, a power amplification headroom of the transmitter.

14. The method of claim 13, further comprising:
decreasing, by the access terminal, the data rate for data packets to be transmitted from the transmitter module if the first set of conditions is satisfied, wherein the first set of conditions further comprise determining, by the access terminal, that the averaged power amplification headroom is less than the threshold level.

15. The method of claim 14, wherein the first set of conditions further comprises:
determining, by the access terminal, that the transmitter is transmitting at a maximum power level; and
determining, by the access terminal, that the data rate is greater than a minimum data rate of the transmitter.

16. The method of claim 11, further comprising:
decreasing, by the access terminal, the transmit power level for data packets to be transmitted from the transmitter module if the second set of conditions is not satisfied and the control data comprises the second command.

17. The method of claim 11, wherein the second set of conditions further comprises determining, by the access terminal, that the power amplification headroom is greater than the threshold level.

18. The method of claim 17, wherein the second set of conditions further comprises determining, by the access terminal, the data rate has remained constant for longer than a threshold period of time.

19. A computer program product residing on a non-transitory processor-readable medium and comprising processor-readable instructions configured to cause a processor to:
transmit data packets to a gateway via a satellite;
receive, responsive to the transmitted data packets, control data transmitted by the gateway to the access terminal via the satellite;
evaluate the control data;
if the control data comprises a first command and a first set of conditions is not satisfied, adjusting a power level of data packets to be transmitted by the transmitter module;

if the control data comprises a second command different from the first command and a second set of conditions is satisfied, increasing a data rate of data packets to be transmitted from the transmitter module.

20. The computer program product of claim 19, wherein the control data is a single variable.

21. The computer program product of claim 19, wherein the control data is a single bit.

22. The computer program product of claim 19, wherein the processor-readable instructions further comprise instructions configured to cause the processor to evaluate a power amplification headroom of the transmitter.

23. The computer program product of claim 22, wherein the processor-readable instructions further comprise instructions configured to cause the processor to:
   decrease the data rate for data packets to be transmitted from the transmitter module when the first set of conditions is satisfied, wherein the first set of conditions comprises:
      determining that the control data comprises the first command; and
      determining that the power amplification headroom is less than the threshold level.

24. The computer program product of claim 19, wherein the processor-readable instructions further comprise instructions configured to cause the processor to:
   decrease the transmit power level for data packets to be transmitted from the transmitter module if the second set of conditions is not satisfied and the control data comprises the second command.

25. The computer program product of claim 19, wherein the second set of conditions further comprises:
   determining that the power amplification headroom is greater than a threshold level.

26. The computer program product of claim 25, wherein the second set of conditions further comprises determining that the data rate has remained constant for longer than a threshold period of time.

27. An access terminal, comprising:
   means for transmitting data packets to a gateway via a satellite;
   means for receiving, responsive to the transmitted data packets, control data generated at the gateway and transmitted from the gateway to the access terminal via the satellite;
   means for evaluating the received control data;
   means for adjusting a transmit power level for data packets to be transmitted from the access terminal if the control data comprises a first command and a first set of conditions is not satisfied; and
   means for increasing a data rate for data packets to be transmitted from the access terminal if the control data comprises a second command different from the first command and a second set of conditions is satisfied.

28. The access terminal of claim 27, wherein the control data is a single bit.

29. The access terminal of claim 27, further comprising:
   means for evaluating power amplification headroom of the transmitter; and
   means for determining whether the power amplification headroom is greater than a threshold level when the control data comprises the first command.

30. The access terminal of claim 29, wherein the control module is further configured to decrease the data rate for data packets to be transmitted from the access terminal if the first set of conditions is satisfied, wherein in the first set of conditions the control data comprises a determination that the power amplification headroom is less than the threshold level.

31. The access terminal of claim 27, further comprising:
   means for decreasing the transmit power level for data packets to be transmitted if the second set of conditions is not satisfied, wherein in the second set of conditions the control data comprises the second command.

32. The access terminal of claim 31, wherein the second set of conditions includes a determination that the power amplification headroom is greater than a threshold level.

33. The access terminal of claim 31, wherein the second set of conditions further comprises the data rate having remained constant for longer than a threshold period of time.

34. The access terminal of claim 33, wherein the second set of conditions further comprises the data rate being lower than a maximum data rate.

35. A communications system, comprising:
   a gateway configured to:
      receive a communication signal comprising voice packets from an access terminal via a satellite;
      determine a data rate of the data packets received from the access terminal via the satellite using blind detection;
      evaluate a power level of the communication signal; and
      transmit control data responsive to the power level evaluation of the communication signal; and
   the access terminal, in communication with the gateway via the satellite, configured to:
      transmit the communication signal to the gateway via the satellite;
      receive the control data from the gateway via the satellite;
      evaluate the received control data;
      if the control data comprises a first command and a first set of conditions is not satisfied, adjust a transmit power level for data packets to be transmitted from the access terminal; and
      if the control data comprises a second command different from the first command and a second set of conditions is satisfied, increase a data rate for data packets to be transmitted from the access terminal.

36. The communications system of claim 35, wherein the control data transmitted by the gateway is part of data packets.

37. The communications system of claim 35, wherein evaluating the power level of the communication signal at the gateway comprises comparing the received communication signal to a threshold signal strength level.

38. The communications system of claim 35, wherein the control data is a single bit.

39. The communications system of claim 35, further comprising routing data received as part of a data packet from the access terminal via the satellite to another network.

40. The communications system of claim 35, wherein the access terminal is further configured to decrease the transmit power level for data packets to be transmitted if the second set of conditions is not satisfied and the control data comprises the second command.

* * * * *